(12) United States Patent
Hsu

(10) Patent No.: US 12,317,005 B2
(45) Date of Patent: May 27, 2025

(54) WAVELENGTH CONVERSION MODULE AND PROJECTION DEVICE

(71) Applicant: Coretronic Corporation, Hsin-Chu (TW)

(72) Inventor: Pi-Tsung Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 83 days.

(21) Appl. No.: 18/180,867

(22) Filed: Mar. 9, 2023

(65) Prior Publication Data

US 2023/0291874 A1      Sep. 14, 2023

(30) Foreign Application Priority Data

Mar. 11, 2022   (CN) .......................... 202210236626.7

(51) Int. Cl.
| | |
|---|---|
| *H04N 9/31* | (2006.01) |
| *G02B 7/00* | (2021.01) |
| *G02B 13/00* | (2006.01) |
| *G02B 27/18* | (2006.01) |

(52) U.S. Cl.
CPC ............ *H04N 9/312* (2013.01); *G02B 7/003* (2013.01); *G02B 13/0015* (2013.01); *G02B 27/18* (2013.01); *H04N 9/3152* (2013.01)

(58) Field of Classification Search
CPC .... H04N 9/312; H04N 9/3152; H04N 9/3111; H04N 9/3158; G02B 7/003; G02B 13/0015; G02B 27/18; G02B 26/008; G03B 21/34; G03B 21/006; G03B 21/008; G03B 21/14; G03B 21/16; G03B 21/2033
See application file for complete search history.

(56) References Cited

U.S. PATENT DOCUMENTS

| | | | | |
|---|---|---|---|---|
| 2019/0121119 | A1* | 4/2019 | Chen | ................... G03B 21/2066 |
| 2020/0026171 | A1* | 1/2020 | Hsieh | ......................... B32B 7/12 |
| 2020/0064620 | A1* | 2/2020 | Chen | .................... G03B 21/204 |

FOREIGN PATENT DOCUMENTS

| | | |
|---|---|---|
| CN | 106154702 | 12/2018 |
| CN | 211826878 | 10/2020 |

* cited by examiner

*Primary Examiner* — Kyu Chae
(74) *Attorney, Agent, or Firm* — JCIPRNET

(57) ABSTRACT

Provided is a wavelength conversion module including a driving assembly, a metal substrate, a first and a second concave-convex structure, a transparent plate, and a wavelength conversion layer. The driving assembly is connected to the substrate and drives the substrate to rotate. The substrate and the first and the second concave-convex structure are integrally formed. The first and the second concave-convex structure are disposed around the center, and the second concave-convex structure surrounds the first concave-convex structure. The substrate has a first balance hole and an accommodating groove. The first concave-convex structure is located between the accommodating groove and the center. The first balance hole is located in the accommodating groove and penetrates the substrate. The transparent plate is disposed in the accommodating groove of the substrate and covers the first balance hole. The wavelength conversion layer is arranged in an annular pattern with the transparent plate.

21 Claims, 12 Drawing Sheets

WAVELENGTH CONVERSION MODULE AND PROJECTION DEVICE

CROSS-REFERENCE TO RELATED APPLICATION

This application claims the priority benefit of China application serial no. 202210236626.7 filed on Mar. 11, 2022. The entirety of the above-mentioned patent application is hereby incorporated by reference herein and made a part of this specification.

BACKGROUND

Technical Field

The invention relates to an optical module and a projection device, and particularly relates to a wavelength conversion module and a projection device having the wavelength conversion module.

Description of Related Art

A laser light source module is usually configured in a solid-state illumination (SSI) projector, and a phosphor wheel is located on the transmission path of an excitation beam coming from the laser light source module, and the excitation beam emitted by the laser light source module is blue light and is projected onto a light wavelength conversion area of the phosphor wheel to excite a yellow converted beam, so as to achieve a purpose of synthesizing white light. Generally, a metal weight ring is additionally assembled with the phosphor wheel structure for subsequent balance correction, and the metal weight ring may also be filled with a balancing substance, balancing glue, or the like. Currently, the metal weight ring is mostly fixed to a heat dissipation substrate through a gluing process. However, the glue is susceptible to heat energy coming from the heat dissipation substrate, which degrades the glue and reduces the reliability of the phosphor wheel structure. Moreover, the structure of the metal weight ring is relatively complex and has a higher production cost, and the phosphor wheel structure cannot be simplified due to limitation of the metal weight ring, which may easily cause vibration and noise during an operation process of the phosphor wheel and affect the performance and service life of the phosphor wheel accordingly. In addition, a groove is generally provided on the existing heat dissipation substrate to accommodate a coated transparent glass, and the metal weight ring needs to be in contact with a part of the coated transparent glass to fix the coated transparent glass. Therefore, without the metal weight ring, the coated transparent glass is unable to be fixed effectively and has a low structural reliability.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a wavelength conversion module with better reliability.

The invention is directed to a projection device, which includes the above-mentioned wavelength conversion module, and has higher reliability and longer service life.

Other objects and advantages of the invention may be further illustrated by the technical features broadly embodied and described as follows.

In order to achieve one or a portion of or all of the objects or other objects, an embodiment of the invention provides a wavelength conversion module including a driving assembly, a substrate, a first concave-convex structure, a second concave-convex structure, a transparent plate, and a wavelength conversion layer. The driving assembly is connected to the substrate and drives the substrate to rotate around the center of the substrate. The substrate is a metal substrate, and the substrate, the first concave-convex structure and the second concave-convex structure are integrally formed. The first concave-convex structure and the second concave-convex structure are disposed around the center of the substrate, and the second concave-convex structure surrounds the first concave-convex structure. The substrate has a first balance hole and an accommodating groove. The first concave-convex structure is located between the accommodating groove and the center in a radial direction of the substrate. The first balance hole is located in the accommodating groove and penetrates the substrate. The transparent plate is disposed in the accommodating groove of the substrate and covers the first balance hole. The wavelength conversion layer is disposed on the substrate, and is arranged in an annular pattern with the transparent plate.

In order to achieve one or a portion of or all of the objects or other objects, an embodiment of the invention provides a projection device including an illumination module, a light valve and a projection lens. The illumination module is configured to provide an illumination beam, and the illumination module includes a light source device and a wavelength conversion module. The light source device is configured to provide an excitation beam. The wavelength conversion module is arranged on a transmission path of the excitation beam. The wavelength conversion module includes a driving assembly, a substrate, a first concave-convex structure, a second concave-convex structure, a transparent plate, and a wavelength conversion layer. The driving assembly is connected to the substrate and drives the substrate to rotate around the center of the substrate. The substrate is a metal substrate, and the substrate, the first concave-convex structure and the second concave-convex structure are integrally formed. The first concave-convex structure and the second concave-convex structure are disposed around the center of the substrate, and the second concave-convex structure surrounds the first concave-convex structure. The substrate has a first balance hole and an accommodating groove. The first concave-convex structure is located between the accommodating groove and the center in a radial direction of the substrate. The first balance hole is located in the accommodating groove and penetrates the substrate. The transparent plate is disposed in the accommodating groove of the substrate and covers the first balance hole. The wavelength conversion layer is disposed on the substrate, and is arranged in an annular pattern with the transparent plate. The wavelength conversion layer receives the excitation beam and generates a converted beam, and the illumination beam includes at least one of the converted beam and the excitation beam. The light valve is arranged on a transmission path of the illumination beam to convert the illumination beam into an image beam. The projection lens is arranged on a transmission path of the image beam to project the image beam out of the projection device.

Based on the above descriptions, the embodiments of the invention have at least one of following advantages or effects. In the design of the wavelength conversion module of the invention, the substrate is a metal substrate, and the substrate, the first concave-convex structure and the second concave-convex structure are integrally formed, and the substrate has the first balance hole and the accommodating groove, where the first balance hole is located in the accommodating groove and penetrates the substrate, and the transparent plate covers the first balance hole and is arranged in an annular pattern with the wavelength conversion layer. In this way, the effects of balance correction and heat dissipation may be achieved at the same time, so that it is not necessary to configure the metal weight ring through the gluing process as that does in the prior art, accordingly, the process steps may be effectively reduced, the production cost may be reduced and the structural reliability may be improved. In addition, the projection device using the wavelength conversion module of the invention may have higher reliability and longer service life, thereby enhancing product competitiveness.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
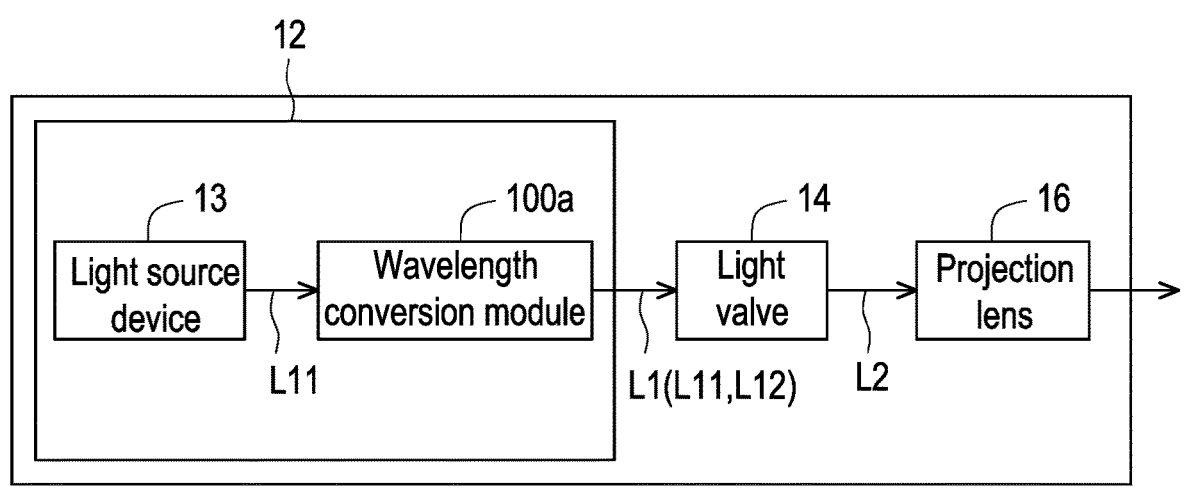
FIG. 1 is a schematic diagram of a projection device according to an embodiment of the invention.

FIG. 1 is a schematic diagram of a projection device according to an embodiment of the invention. Referring to FIG. 1, in the embodiment, the projection device 10 includes an illumination module 12, a light valve 14 and a projection lens 16. The illumination module 12 is configured to provide an illumination beam L1, and the illumination module 12 includes a light source device 13 and a wavelength conversion module 100a. The light source device 13 is configured to provide an excitation beam L11. The wavelength conversion module 100a is arranged on a transmission path of the excitation beam L11 coming from the light source device 13. A wavelength conversion layer 160 of the wavelength conversion module 100a (referring to FIG. 2A) receives the excitation beam L11 and generates a converted beam L12. A wavelength of the converted beam L12 is different from a wavelength of the excitation beam L11. A transparent plate 150 of the wavelength conversion module 100a (referring to FIG. 2A) allows the excitation beam L11 to pass through, and the illumination beam L1 includes at least one of the converted beam L12 and the excitation beam L11. In the embodiment, the excitation beam L11 may be, for example, a blue beam, and the converted beam L12 may be, for example, a yellow beam and/or a green beam, but the invention is not limited thereto. The light valve 14 is disposed on a transmission path of the illumination beam L1 coming from the illumination module 12 to convert the illumination beam L1 into an image beam L2. The projection lens 16 is disposed on a transmission path of the image beam L2 coming from the light valve 14 to project the image beam L2 out of the projection device 10.

In detail, the light source device 13 used in the embodiment is, for example, a laser diode (LD), and is, for example, a laser diode or a laser diode bank. Specifically, any light source that meets a volume requirement according to an actual design may be implemented, which is not limited by the invention. The light valve 14 is, for example, a reflective optical modulator such as a liquid crystal on silicon panel (LCoS panel), a digital micro-mirror device (DMD), etc. In an embodiment, the light valve 14 is, for example, a transmissive optical modulator such as a transparent liquid crystal panel, an electro-optical modulator, a magneto-optic modulator, an acousto-optic modulator (AOM), etc., but the pattern and type of the light valve 14 is not limited by the embodiment. Enough teachings, instructions, and recommendations for detailed steps and implementations of the method that the light valve 14 converts the illumination beam L1 into the image beam L2 may be learned from common knowledge of the technical field, which will not be repeated. In addition, the projection lens 16 includes, for example, a combination of one or a plurality of optical lenses having dioptric powers, such as a biconcave lens, a biconvex lens, a concavo-convex lens, a convexo-concave lens, a plano-convex lens, a plano-concave lens, etc, or various combinations of non-planar lenses. In an embodiment, the projection lens 16 may also include a planar optical lens, which projects the image beam L2 coming from the light valve 14 out of the projection device 10 in a reflective or transmissive manner to form a large-scale image. The pattern and type of the projection lens 16 are not limited by the embodiment.

Figure 2A:
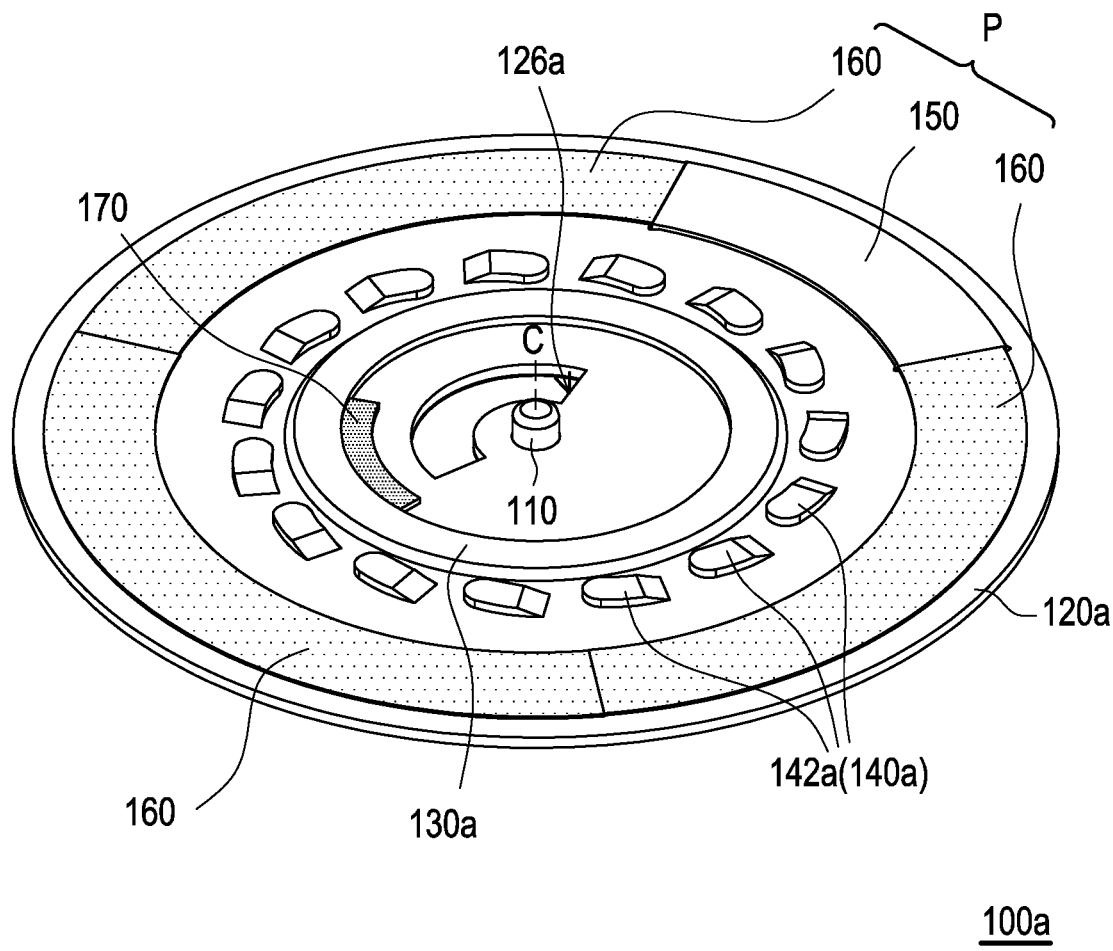
FIG. 2A is a schematic three-dimensional view of a wavelength conversion module of the projection device of FIG. 1.
Figure 2B:
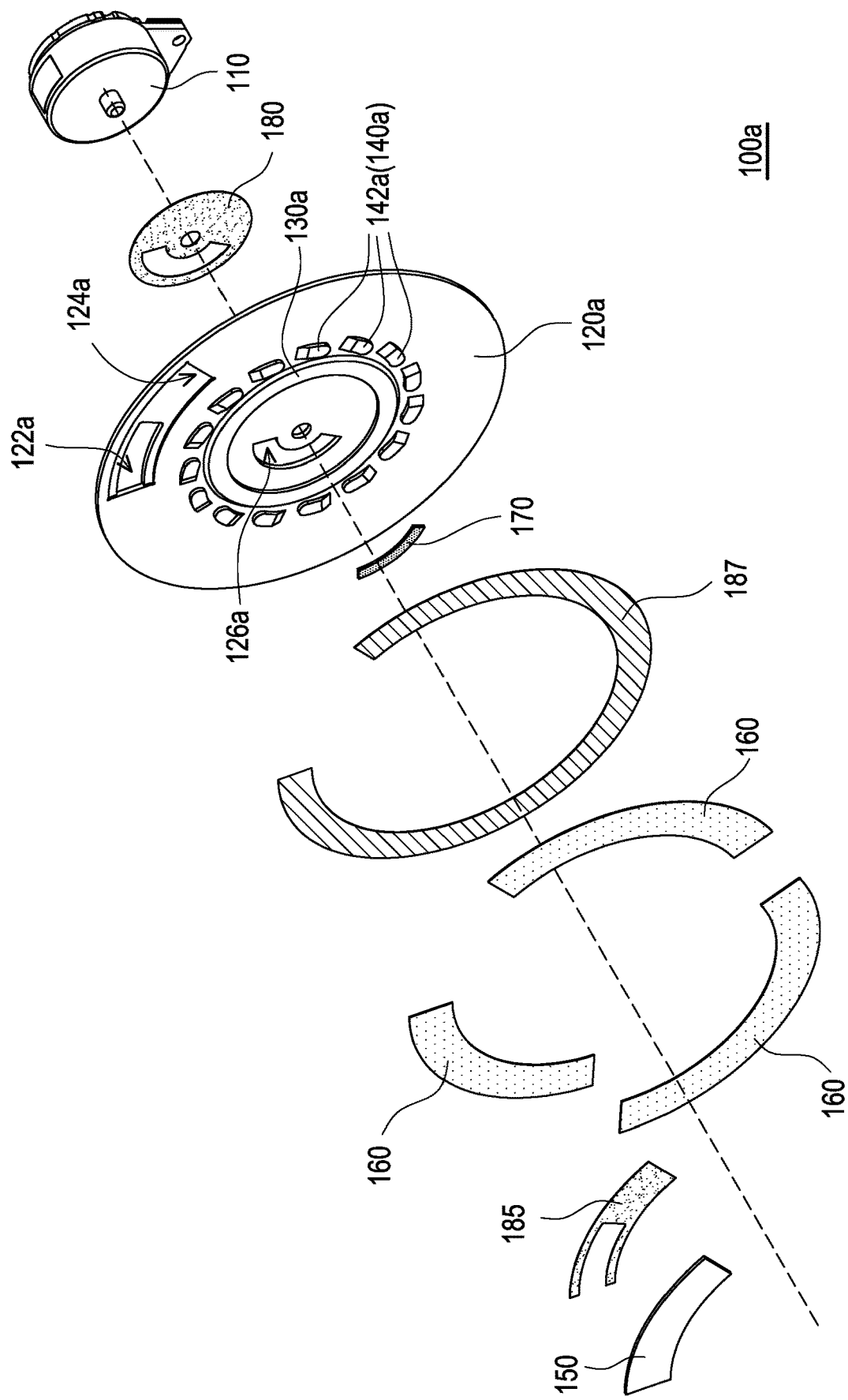
FIG. 2B is a schematic three-dimensional exploded view of the wavelength conversion module of FIG. 2A.
Figure 2C:
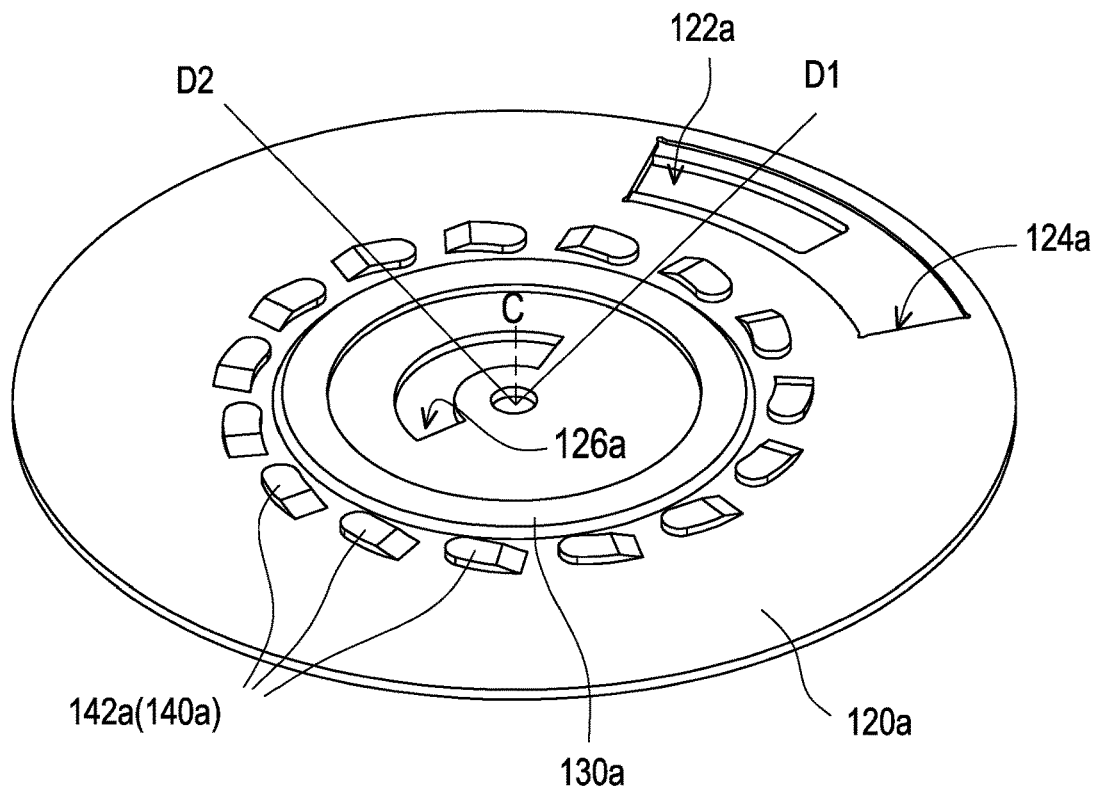
FIG. 2C is a schematic three-dimensional view of a substrate of the wavelength conversion module of FIG. 2A.
Figure 2D:
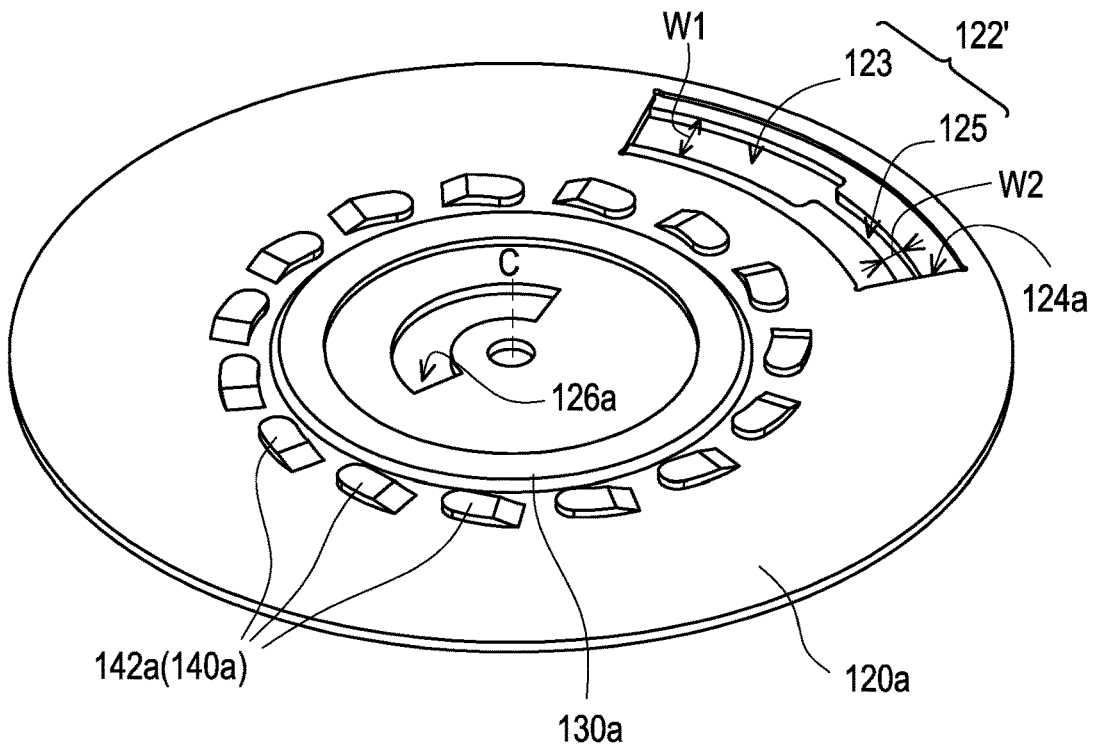
FIG. 2D is a schematic three-dimensional view of a substrate of a wavelength conversion module according to another embodiment of the invention.

FIG. 2A is a schematic three-dimensional view of a wavelength conversion module of the projection device of FIG. 1. FIG. 2B is a schematic three-dimensional exploded view of the wavelength conversion module of FIG. 2A. FIG. 2C is a schematic three-dimensional view of a substrate of the wavelength conversion module of FIG. 2A. FIG. 2D is a schematic three-dimensional view of a substrate of a wavelength conversion module according to another embodiment of the invention.

Referring to FIG. 2A, FIG. 2B and FIG. 2C, in the embodiment, the wavelength conversion module 100a includes a driving assembly 110, a substrate 120a, a first concave-convex structure 130a, a second concave-convex structure 140a, and a transparent plate 150 and a wavelength conversion layer 160. The driving assembly 110 is connected to the substrate 120a, and drives the substrate 120a to rotate around a center C of the substrate 120a. The substrate 120a is a metal substrate, and the substrate 120a, the first concave-convex structure 130a, and the second concave-convex structure 140a are integrally formed. The first concave-convex structure 130a and the second concave-convex structure 140a are, for example, formed by the metal substrate 120a by stamping. The first concave-convex structure 130a and the second concave-convex structure 140a are disposed around the center C of the substrate 120a, and the second concave-convex structure 140a surrounds the first concave-convex structure 130a. The substrate 120a has a first balance hole 122a and an accommodating groove 124a. The first concave-convex structure 130a is located between the accommodating groove 124a and the center C in a radial direction of the substrate 120a. The first balance hole 122a is located in the accommodating groove 124a and penetrates the substrate 120a, where the first balance hole 122a is formed by, for example, penetrating through a bottom surface of the accommodating groove 124a. The transparent plate 150 is disposed in the accommodating groove 124a of the substrate 120a, and completely covers the first balance hole 122a. The wavelength conversion layer 160 is disposed on the substrate 120a and is arranged in a complete annular pattern P with the transparent plate 150. Here, the driving assembly 110 is, for example, a motor, a material of the substrate 120a is, for example, aluminum, aluminum alloy, copper, or stainless steel, a material of the transparent plate 150 is, for example, glass or plastic, the wavelength conversion layer 160 is, for example, a phosphor layer, and the wavelength conversion module 100a includes, for example, a plurality of wavelength conversion layers 160, and these wavelength conversion layers 160 are respectively configured with phosphor layers capable of converting light beams of different wavelengths, but the invention is not limited thereto.

Further, as shown in FIG. 2A, the second concave-convex structure 140a of the embodiment is located between the annular pattern P and the first concave-convex structure 130a in the radial direction of the substrate 120a, i.e., in the radial direction of the substrate 120a and toward the direction away from the center C of the substrate 120a, the first concave-convex structure 130a, the second concave-convex structure 140a and the annular pattern P are sequentially arranged in a concentric annular shape, where the first concave-convex structure 130a is, for example, a complete annular protrusion, and the second concave-convex structure 140a includes, for example, a plurality of turbulent portions 142a separated from each other. Moreover, the wavelength conversion module 100a of the embodiment further includes a filler 170 disposed on the substrate 120a. The filler 170 is located between the first concave-convex structure 130a and the center C in the radial direction of the substrate 120a, and is adjacent to the first concave-convex structure 130a. Namely, the first concave-convex structure 130a may be used as a position for filling the filler 170 with a balance correction substance. Since the first concave-convex structure 130a has a closed annular structure, the filler 170 may be supported on an inner side surface of the first concave-convex structure 130a protruding from a surface of the substrate 120a to withstand a centrifugal force generated when the wavelength conversion module 100a is rotated. The turbulent portions 142a are point-shaped, non-closed and discontinuous annular structures, i.e., the turbulent portions 142a are spaced apart from each other and are annularly distributed on the periphery of the first concave-convex structure 130a, which may drive airflow to flow rapidly to generate turbulence when the wavelength conversion module 100a is rotated at a high speed, so as to increase a heat dissipation effect of the substrate 120a and the wavelength conversion layer 160, thereby reducing a temperature of the wavelength conversion layer 160 to improve excitation efficiency of a wavelength conversion material. Moreover, the arrangement of the first concave-convex structure 130a and the second concave-convex structure 140a also has an effect of enhancing the rigidity of the substrate 120a, thereby reducing deformation of the substrate 120a after stamping, the operation process of the wavelength conversion module 100a and curing.

In addition, referring to FIG. 2A, FIG. 2B and FIG. 2C simultaneously, the substrate 120a of this embodiment further has a second balance hole 126a, where the second balance hole 126a is located between the first concave-convex structure 130a and the center C in the radial direction of the substrate 120a and penetrates the substrate 120a, and the driving assembly 110 connected to the substrate 120a covers the second balance hole 126a, for example, at a surface of the substrate 120a facing to the driving assembly 110. A first connection line D1 between the center of the first balance hole 122a and the center C of the substrate 120a is, for example, perpendicular to a second connection line D2 between the center of the second balance hole 126a and the center C of the substrate 120a, so as to achieve a balance between an X direction and a Y direction, but the invention is not limited thereto.

Moreover, referring to FIG. 2B again, the wavelength conversion module 100a of the embodiment further includes a first adhesive layer 180, a second adhesive layer 185 and a reflective layer 187. The first adhesive layer 180 is disposed between the driving assembly 110 and the substrate 120a, where the driving assembly 110 is connected to the substrate 120a through the first adhesive layer 180. The second adhesive layer 185 is disposed between the transparent plate 150 and the accommodating groove 124a, where the transparent plate 150 is connected to the accommodating groove 124a of the substrate 120a through the second adhesive layer 185. The reflective layer 187 is disposed between the wavelength conversion layer 160 and the substrate 120a, where the reflective layer 187 is, for example, a coated mirror reflection layer, a coated diffuse reflection layer, or a composite of the above two coating films or coatings, but the invention is not limited thereto.

It should be noted that the first balance hole 122a shown in FIG. 2C is embodied as an arc-shaped rectangular through hole extending along a circumferential direction, but the embodiment does not limit the design of the first balance hole 122a. In another embodiment, referring to FIG. 2D, a first balance hole 122a' in the accommodating groove 124a has a first through portion 123 and a second through portion 125 having different radial widths and disposed adjacent to each other, where the first through portion 123 is communicated with the second through portion 125, and a radial width W1 of the first through portion 123 is greater than a radial width W2 of the second through portion 125, but the invention is not limited thereto. Namely, the first through portion 123 and the second through portion 125 have different radial widths in the radial direction, so that a dynamic balance of the wavelength conversion module may be fine-tuned.

In brief, in the embodiment, the substrate 120a, the first concave-convex structure 130a and the second concave-convex structure 140a are integrally formed, where the substrate 120a has the first balance hole 122a, the accommodating groove 124a and the second balance hole 126a, and the transparent plate 150 is disposed in the accommo-dating groove 124a and completely covers the first balance hole 122a, and the driving assembly 110 is adhered to the substrate 120a and completely covers the second balance hole 126a. Under such design, the wavelength conversion module 100a of the embodiment may achieve the effects of balance correction and heat dissipation at the same time, so that it is not necessary to configure the metal weight ring through the gluing process as that does in the prior art, which may effectively reduce the process steps, and reduce the production cost and increase the structural reliability. In addition, the projection device 10 (please refer to FIG. 1) using the wavelength conversion module 100a of the embodiment may have higher reliability and longer service life, thereby enhancing product competitiveness. In addition, the wavelength conversion module 100a of the embodiment does not need to configure an additional metal weight ring to fix the transparent plate. Therefore, the size of the transparent plate may be reduced, thereby reducing the cost and weight of the transparent plate.

It should be noticed that reference numbers of the components and a part of contents of the aforementioned embodiment are also used in the following embodiment, where the same reference numbers denote the same or like components, and descriptions of the same technical contents are omitted. The aforementioned embodiment may be referred for descriptions of the omitted parts, and detailed descriptions thereof are not repeated in the following embodiment.

Figure 3A:
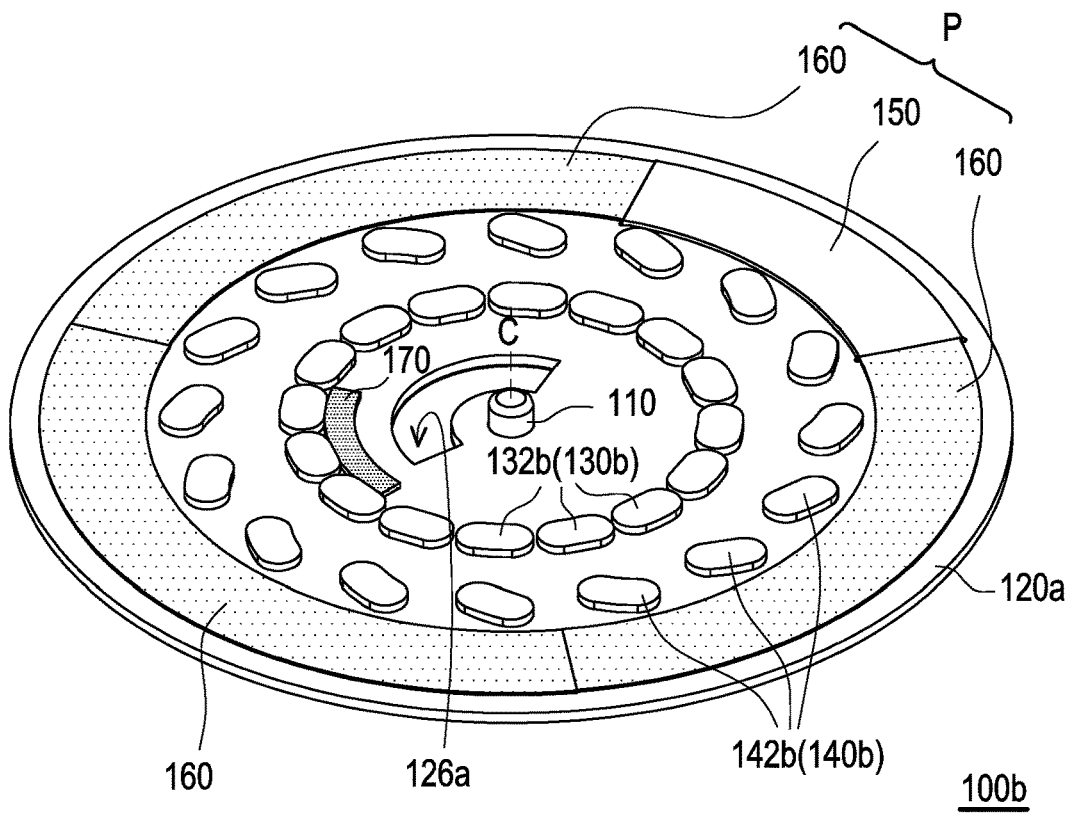
FIG. 3A is a schematic three-dimensional view of a wavelength conversion module according to another embodiment of the invention.
Figure 3B:
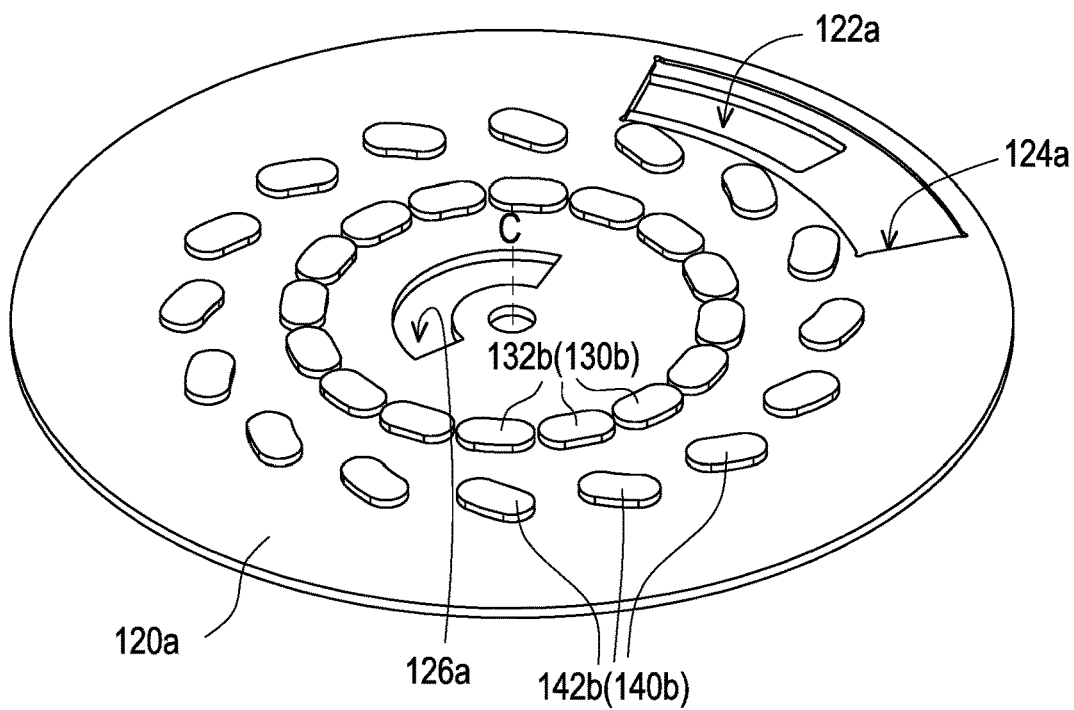
FIG. 3B is a schematic three-dimensional view of a substrate of the wavelength conversion module of FIG. 3A.

FIG. 3A is a schematic three-dimensional view of a wavelength conversion module according to another embodiment of the invention. FIG. 3B is a schematic three-dimensional view of a substrate of the wavelength conversion module of FIG. 3A. Referring to FIG. 2A, FIG. 2C, FIG. 3A and FIG. 3B at the same time, a wavelength conversion module 100b of the embodiment is similar to the wavelength conversion module 100a of FIG. 2A, and a difference there between is that: in the embodiment, a first concave-convex structure 130b includes a plurality of protrusion portions 132b arranged adjacent to each other, where the protrusion portions 132b are close to a closed discontinuous annular structure, and may be used as a position for filling the filler 170 with the balance correction substance. A second concave-convex structure 140b includes a plurality of turbulent portions 142b separated from each other, where the turbulent portions 142b are embodied as a point-shaped non-closed and discontinuous annular structure, which may drive the airflow to flow rapidly to generate turbulence when the wavelength conversion module 100b is rotated at a high speed, so as to increase a heat dissipation effect of the substrate 120a and the wavelength conversion layer 160, thereby reducing a temperature of the wavelength conversion layer 160 to improve excitation efficiency of the wavelength conversion material. Further, an interval between the protrusion portions 132b of the first concave-convex structure 130b in a circumferential direction is smaller than an interval between the turbulent portions 142b of the second concave-convex structure 140b in the circumferential direction.

Figure 4A:
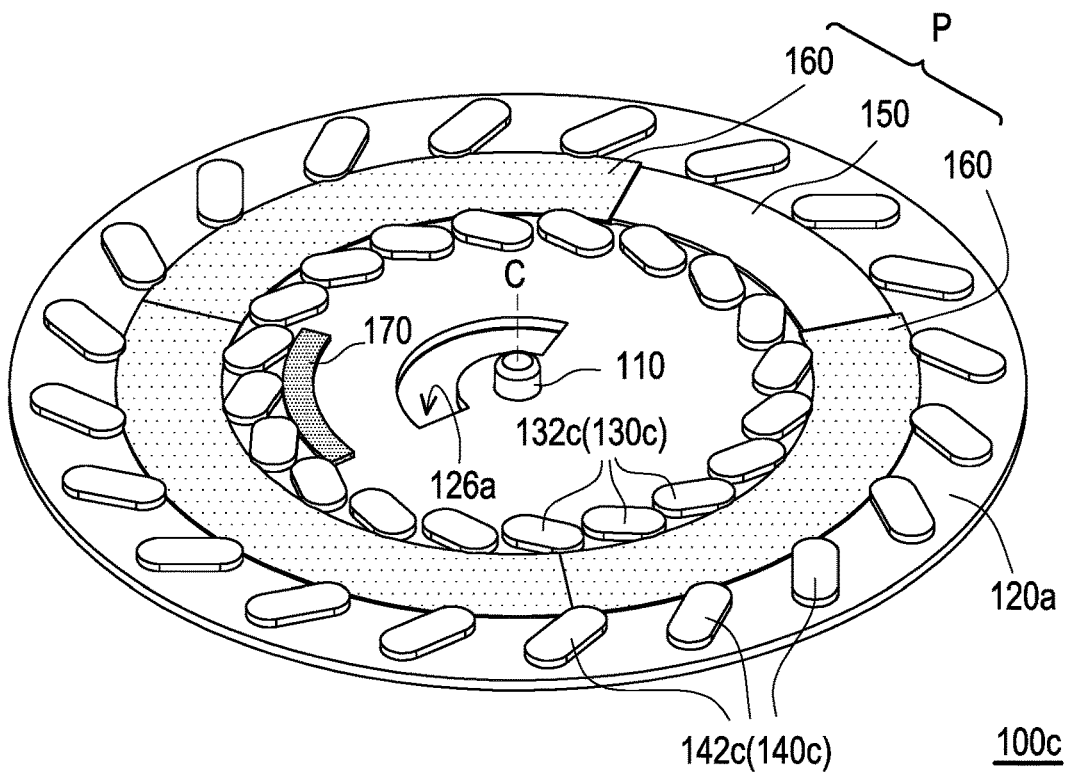
FIG. 4A is a schematic three-dimensional view of a wavelength conversion module according to another embodiment of the invention.
Figure 4B:
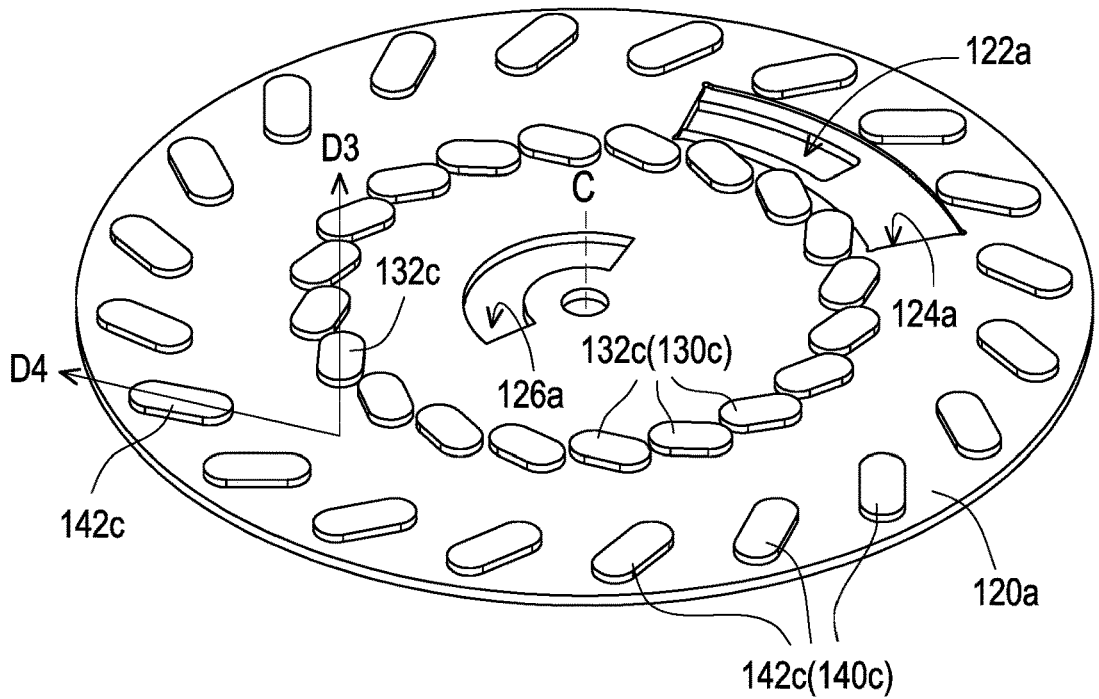
FIG. 4B is a schematic three-dimensional view of a substrate of the wavelength conversion module of FIG. 4A.

FIG. 4A is a schematic three-dimensional view of a wavelength conversion module according to another embodiment of the invention. FIG. 4B is a schematic three-dimensional view of a substrate of the wavelength conversion module of FIG. 4A. Referring to FIG. 3A, FIG. 3B, FIG. 4A and FIG. 4B at the same time, a wavelength conversion module 100c of the embodiment is similar to the wavelength conversion module 100b of FIG. 3A, and a difference there between is that in the embodiment, the annular pattern P is located between a second concave-convex structure 140c and a first concave-convex structure 130c, i.e., in the radial direction of the substrate 120a and in a direction away from the center C of the substrate 120a, the first concave-convex structure 130c, the annular pattern P and the second concave-convex structure 140c are sequentially arranged in a concentric annular shape.

In detail, in the embodiment, the first concave-convex structure 130c includes a plurality of protrusion portions 132c arranged adjacent to each other, and the second concave-convex structure 140c includes a plurality of turbulent portions 142c separated from each other. The protrusion portions 132c are arranged in an approximately closed annular structure, and are mainly used as a position for filling the filler 170 with the balance correction substance, while the turbulent portions 142c present a point-shaped, non-closed and discontinuous annular structure, which mainly produce a turbulence when the wavelength conversion module 100c is rotated at a high speed, so as to increase a heat dissipation effect of the substrate 120a and the wavelength conversion layer 160, thereby reducing a temperature of the wavelength conversion layer 160 to improve excitation efficiency of the wavelength conversion material.

Preferably, at least one of the first concave-convex structure 130c and the second concave-convex structure 140c contacts the wavelength conversion layer 160. Here, the first concave-convex structure 130c is disposed at an inner side the wavelength conversion layer 160, and the second concave-convex structure 140c is disposed at an outer side the wavelength conversion layer 160, and the protrusion portions 132c and the turbulent portions 142c contact the wavelength conversion layer 160. A first extending direction D3 of any one of the protrusion portions 132c (e.g. the long axial direction of the protrusion portions 132c) and a second extending direction D4 of the corresponding turbulent portion 142c (e.g. the long axial direction of the corresponding turbulent portion 142c) form a V shape (or a funnel shape) with each other, so that the airflow generated when the wavelength conversion module 100c is rotated may flow along gaps between the protrusion portions 132c and between the turbulent portions 142c, so that a larger proportion of the airflow enters the surface of the wavelength conversion layer 160 and the positions of the substrate 120a on both sides thereof, which may dissipate the heat generated by the wavelength conversion layer 160, so as to improve the heat dissipation efficiency. In addition, the design of the protrusion portions 132c and the turbulent portions 142c increases a heat dissipation surface area, thereby improving the heat dissipation efficiency of the wavelength conversion module 100c at the same time.

Figure 5A:
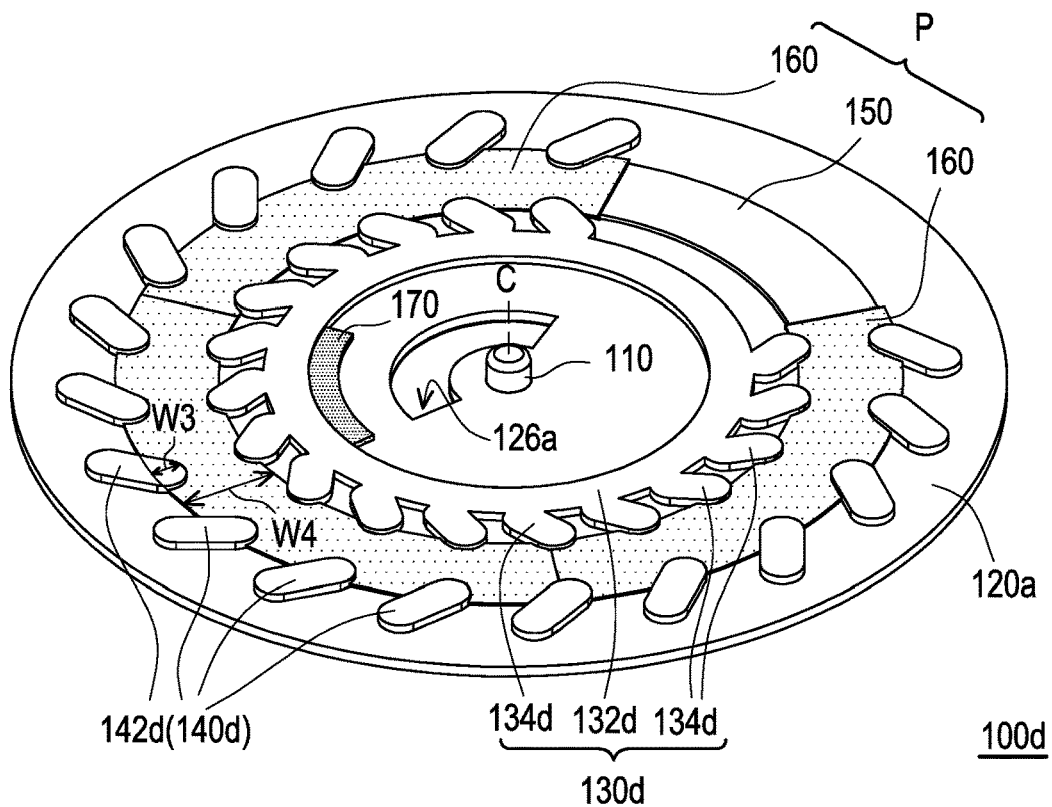
FIG. 5A is a schematic three-dimensional view of a wavelength conversion module according to another embodiment of the invention.
Figure 5B:
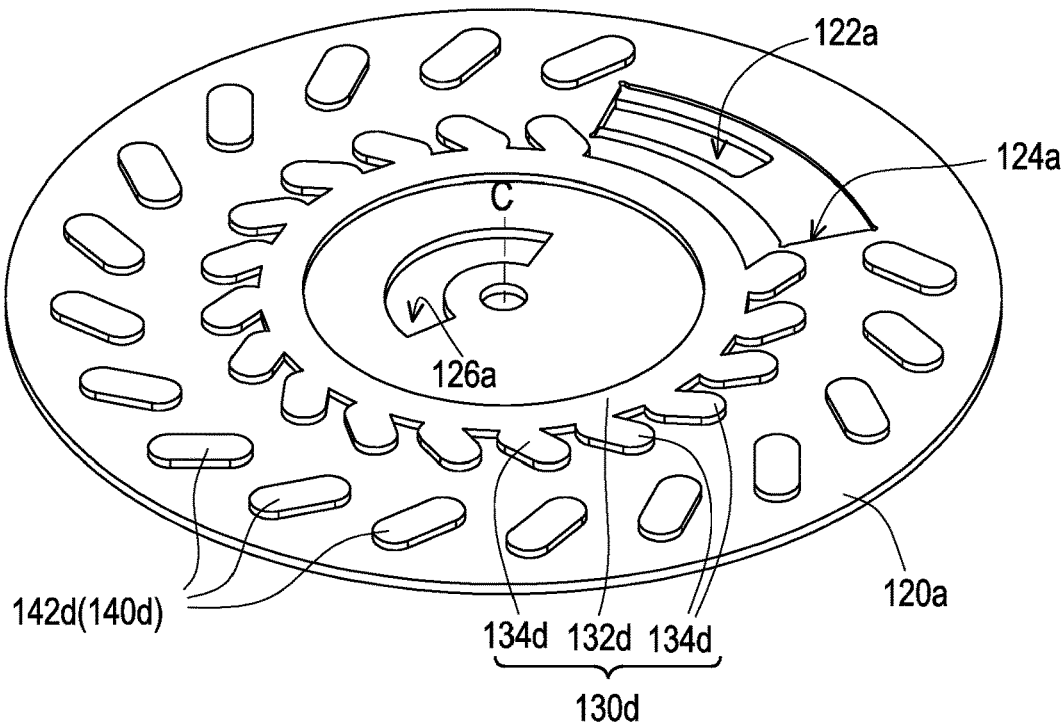
FIG. 5B is a schematic three-dimensional view of a substrate of the wavelength conversion module of FIG. 5A.

FIG. 5A is a schematic three-dimensional view of a wavelength conversion module according to another embodiment of the invention. FIG. 5B is a schematic three-dimensional view of a substrate of the wavelength conversion module of FIG. 5A. Referring to FIG. 4A, FIG. 4B, FIG. 5A and FIG. 5B at the same time, a wavelength conversion module 100d of the embodiment is similar to the wavelength conversion module 100c of FIG. 4A, and a difference there between is that in the embodiment, a first concave-convex structure 130d includes a complete annular protrusion 132d and a plurality of extended protrusion portions 134d separated from each other. One end of each extended protrusion portion 134d is connected to the annular protrusion 132d and radially extends from the annular protrusion 132d toward the second concave-convex structure 140d. The second concave-convex structure 140d includes a plurality of turbulent portions 142d separated from each other.

In detail, in the embodiment, at least one of the extended protrusion portions 134d and the turbulent portions 142d extends into the wavelength conversion layer 160 to form a first radial width W3. Preferably, the first radial width W3 is greater than 1/10 of a second radial width W4 of the wavelength conversion layer 160 on the substrate 120a and less than 1/2 of the second radial width W4 of the wavelength conversion layer 160. The design of the extended protrusion portions 134d and the turbulent portions 142d may not only increase the turbulence of the heat dissipation airflow, but may also reduce the heat energy conducted from the substrate 120a to the filler 170 due to the increase of the heat dissipation area. In addition, since the positions of the extended protrusion portions 134d and the turbulent portions 142d are closer to a light spot formed by the excitation beam on the wavelength conversion layer 160, the heat dissipation efficiency may be improved by about 20% to 30%.

Figure 6A:
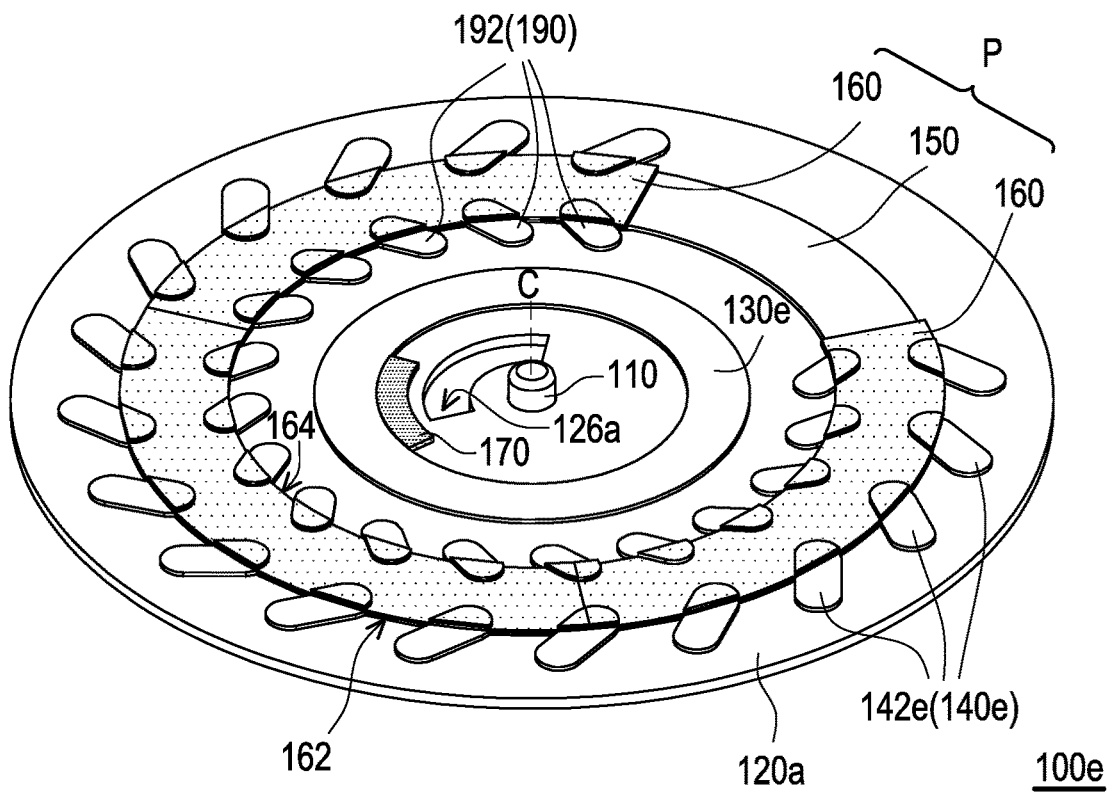
FIG. 6A is a schematic three-dimensional view of a wavelength conversion module according to another embodiment of the invention.
Figure 6B:
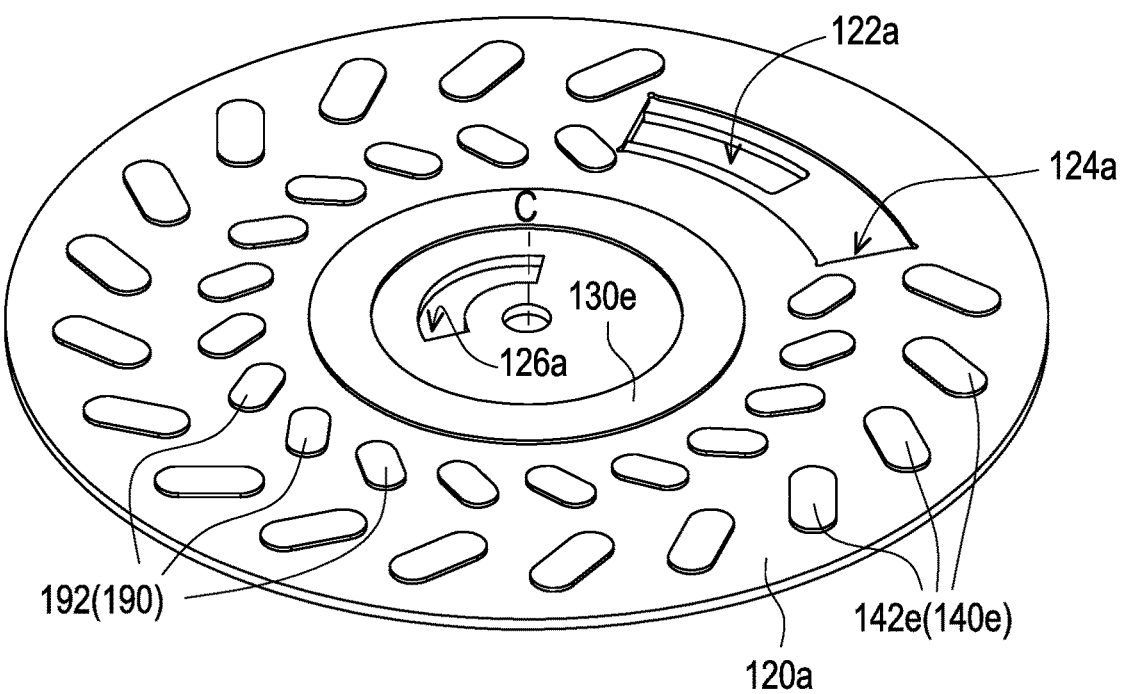
FIG. 6B is a schematic three-dimensional view of a substrate of the wavelength conversion module of FIG. 6A.

FIG. 6A is a schematic three-dimensional view of a wavelength conversion module according to another embodiment of the invention. FIG. 6B is a schematic three-dimensional view of a substrate of the wavelength conversion module of FIG. 6A. Referring to FIG. 5A, FIG. 5B, FIG. 6A and FIG. 6B at the same time, a wavelength conversion module 100e of the embodiment is similar to the wavelength conversion module 100d of FIG. 5A, and a difference there between is that in the embodiment, a first concave-convex structure 130e of the wavelength conversion module 100e includes a complete annular protrusion (without the extended protrusion portion), and the wavelength conversion module 100e further includes a third concave-convex structure 190, the third concave-convex structure 190 and the substrate 120a, the first concave-convex structure 130e and the second concave-convex structure 140e are integrally formed. The third concave-convex structure 190 is disposed around the center C of the substrate 120a and is located between the second concave-convex structure 140e and the first concave-convex structure 130e. The annular pattern P is located between the second concave-convex structure 140e and the third concave-convex structure 190. Namely, in the radial direction of the substrate 120a and a direction away from the center C of the substrate 120a, the first concave-convex structure 130e, the third concave-convex structure 190, the annular pattern P and the second concave-convex structure 140e are sequentially arranged in a concentric annular shape.

In detail, in the embodiment, the first concave-convex structure 130e is a complete annular protrusion, and the second concave-convex structure 140e and the third concave-convex structure 190 respectively include a plurality of turbulent portions 142e, 192 separated from each other. An inner side 164 of the wavelength conversion layer 160 covers a part of the turbulent portions 192, while an outer side 162 of the wavelength conversion layer 160 covers a part of the turbulent portions 142e, i.e., one end of each of the turbulent portions 192 is covered by the inner side 164 of the wavelength conversion layer 160, and one end of each of the turbulent portions 142e is covered by the outer side 162 of the wavelength conversion layer 160. Namely, a part of the second concave-convex structure 140e and a part of the third concave-convex structure 190 are disposed under the wavelength conversion layer 160, so that the wavelength conversion layer 160 presents a stepped shape. In addition, since the positions of the turbulent portions 142e and 192 are closer to the light spot formed by the excitation beam on the wavelength conversion layer 160, the heat dissipation efficiency of the wavelength conversion module 100e may be improved.

Figure 7A:
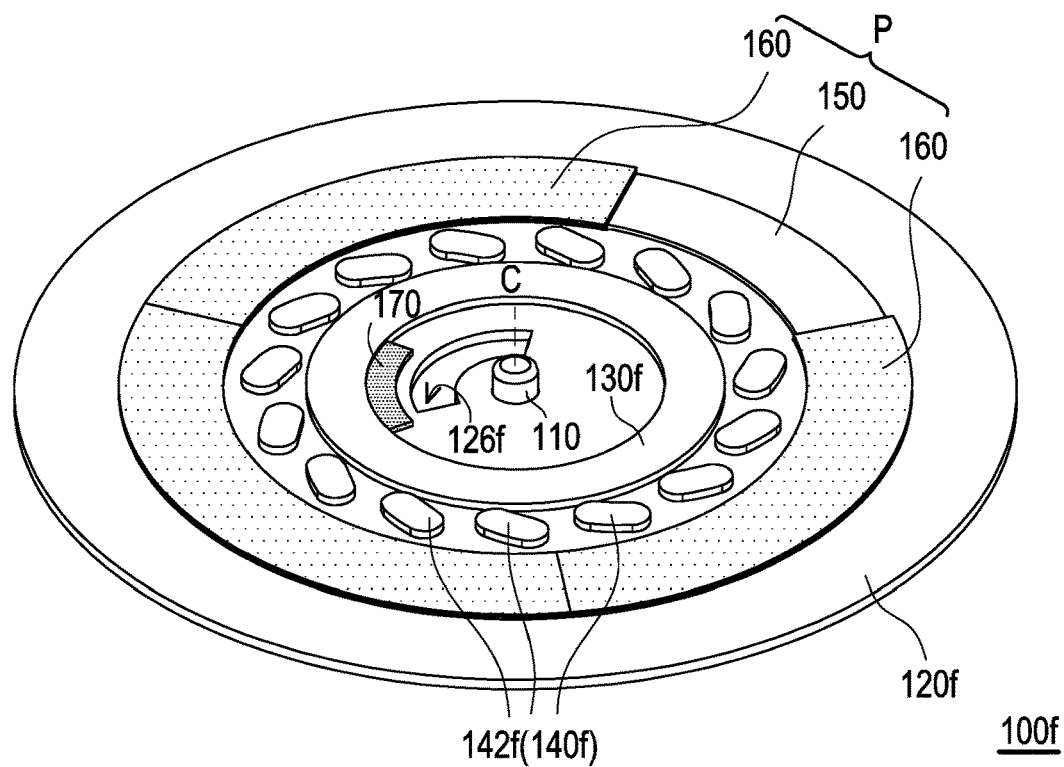
FIG. 7A is a schematic three-dimensional view of a wavelength conversion module according to another embodiment of the invention.
Figure 7B:
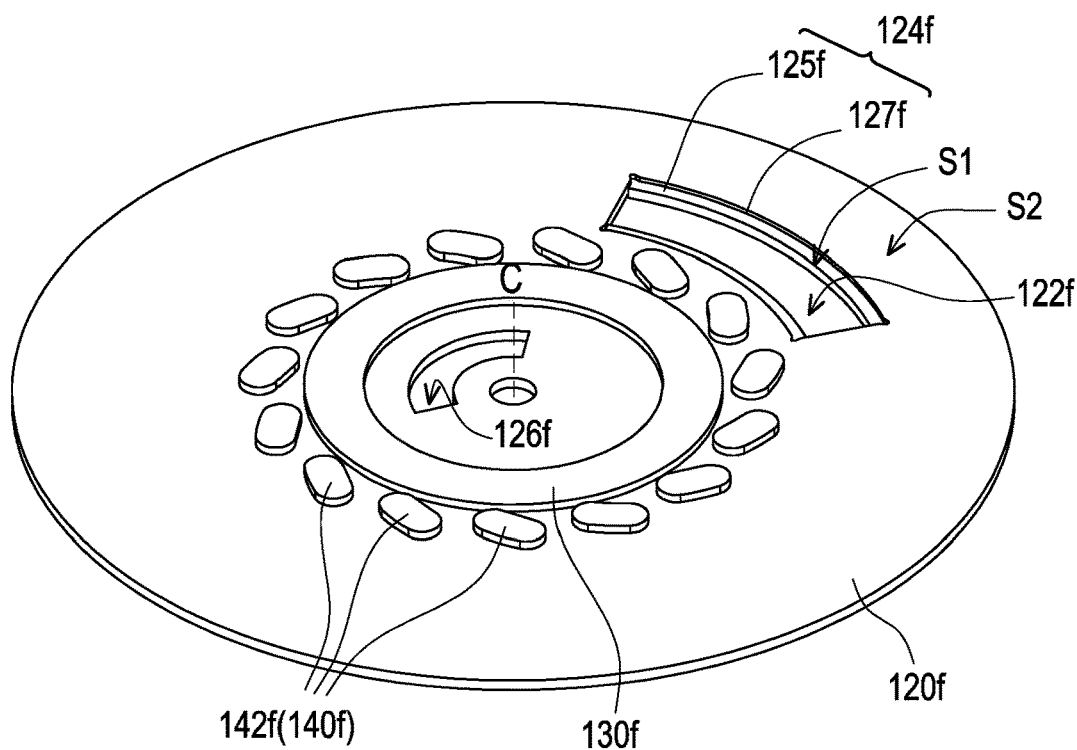
FIG. 7B is a schematic three-dimensional view of a substrate of the wavelength conversion module of FIG. 7A.

FIG. 7A is a schematic three-dimensional view of a wavelength conversion module according to another embodiment of the invention. FIG. 7B is a schematic three-dimensional view of a substrate of the wavelength conversion module of FIG. 7A. Referring to FIG. 2A, FIG. 2B, FIG. 7A and FIG. 7B at the same time, a wavelength conversion module 100f of the embodiment is similar to the wavelength conversion module 100a of FIG. 2A, i.e., a second concave-convex structure 140f is located between the annular pattern P and a first concave-convex structure 130f, where the first concave-convex structure 130f is a complete annular protrusion, and the second concave-convex structure 140f includes a plurality of turbulent portions 142f separated from each other. A second balance hole 126f is located between the first concave-convex structure 130f and the center C in a radial direction of a substrate 120f and penetrates the substrate 120f, and the driving assembly 110 connected to the substrate 120f completely covers the second balance hole 126f.

A difference between the wavelength conversion module 100f of the embodiment and the wavelength conversion module 100a of FIG. 2A is that in the embodiment, an accommodating groove 124f of a substrate 120f includes a support portion 125f and a sidewall portion 127f. A bearing surface S1 of the support portion 125f is recessed from a surface S2 of the substrate 120f, and the sidewall portion 127f is connected to the surface S2 of the substrate 120f and the bearing surface S1 of the support portion 125f. The transparent plate 150 is fixed on the support portion 125f, and the support portion 125f surrounds at least two sides of a first balance hole 122f. In this way, the transparent plate 150 may be disposed on the support portion 125f of the accommodating groove 124f, and the transparent plate 150 is aligned with the surface S2 of the substrate 120f or aligned with a surface of the adjacent wavelength conversion layer 160. Compared with the prior art where the metal weight ring has to be additionally used to assist fixing, in the embodiment, the transparent plate 150 may be supported by the support portion 125f on a larger surface, and additional components are not required, which may effectively improve the overall reliability.

Moreover, the accommodating groove 124f of the embodiment is further provided with a first balance hole 122f, which may be used to balance the unbalance of the wavelength conversion module 100f caused by different bearing substances at different positions. In addition, in a light path structure where the blue excitation beam needs to penetrate through the wavelength conversion module 100f, the first balance hole 122f may allow the blue excitation beam to penetrate through, and compared to the prior art where a blue light through hole is directly opened without additional attaching a glass transmissive phosphor wheel, in the embodiment, the transparent plate 150 completely covers the first balance hole 122f to avoid a wind shear sound caused by air passing through the first balance hole 122f. Moreover, the substrate 120f of the embodiment is further provided with a second balance hole 126f located at a bonding position of the substrate 120f and the driving assembly 110, so that the hollowed second balance hole 126f is a non-penetrating hole after the wavelength conversion module 100f is assembled, or although it penetrates, it is completely covered by the driving assembly 110 in a projection direction, which may avoid noise generated by the wind shear when the wavelength conversion module 100f is operated.

Figure 8A:
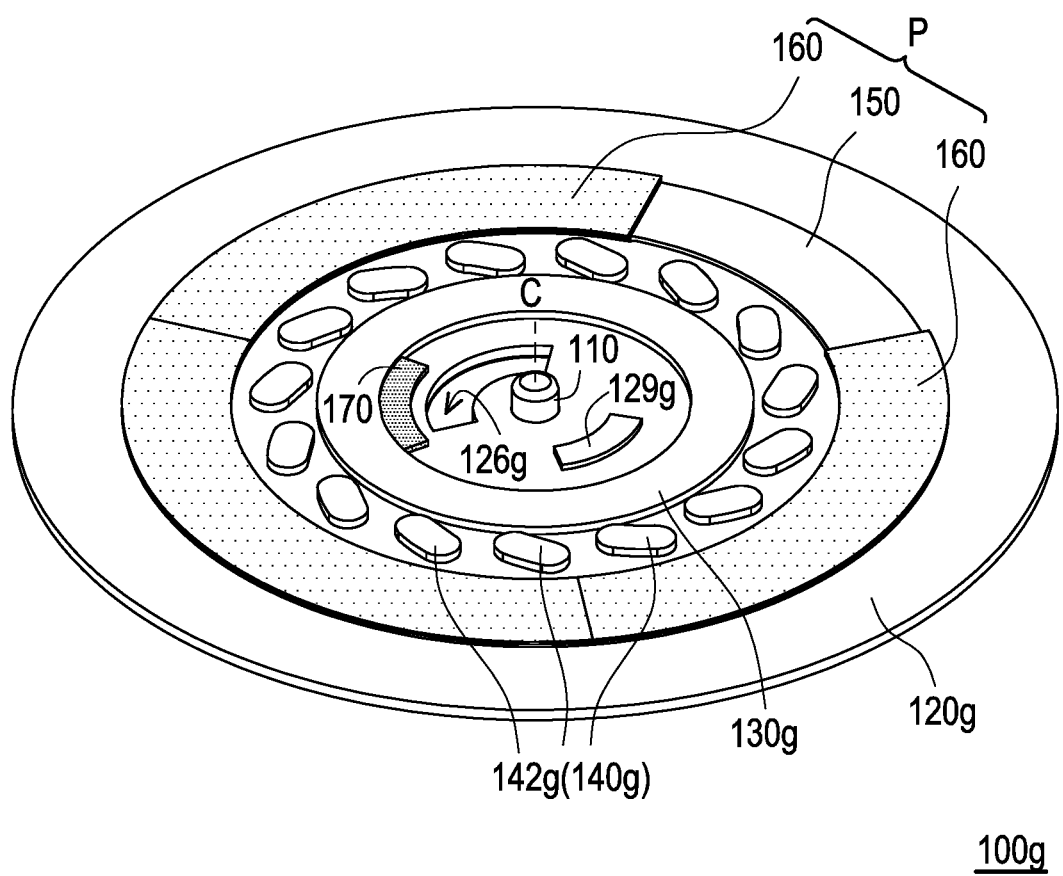
FIG. 8A is a schematic three-dimensional view of a wavelength conversion module according to another embodiment of the invention.
Figure 8B:
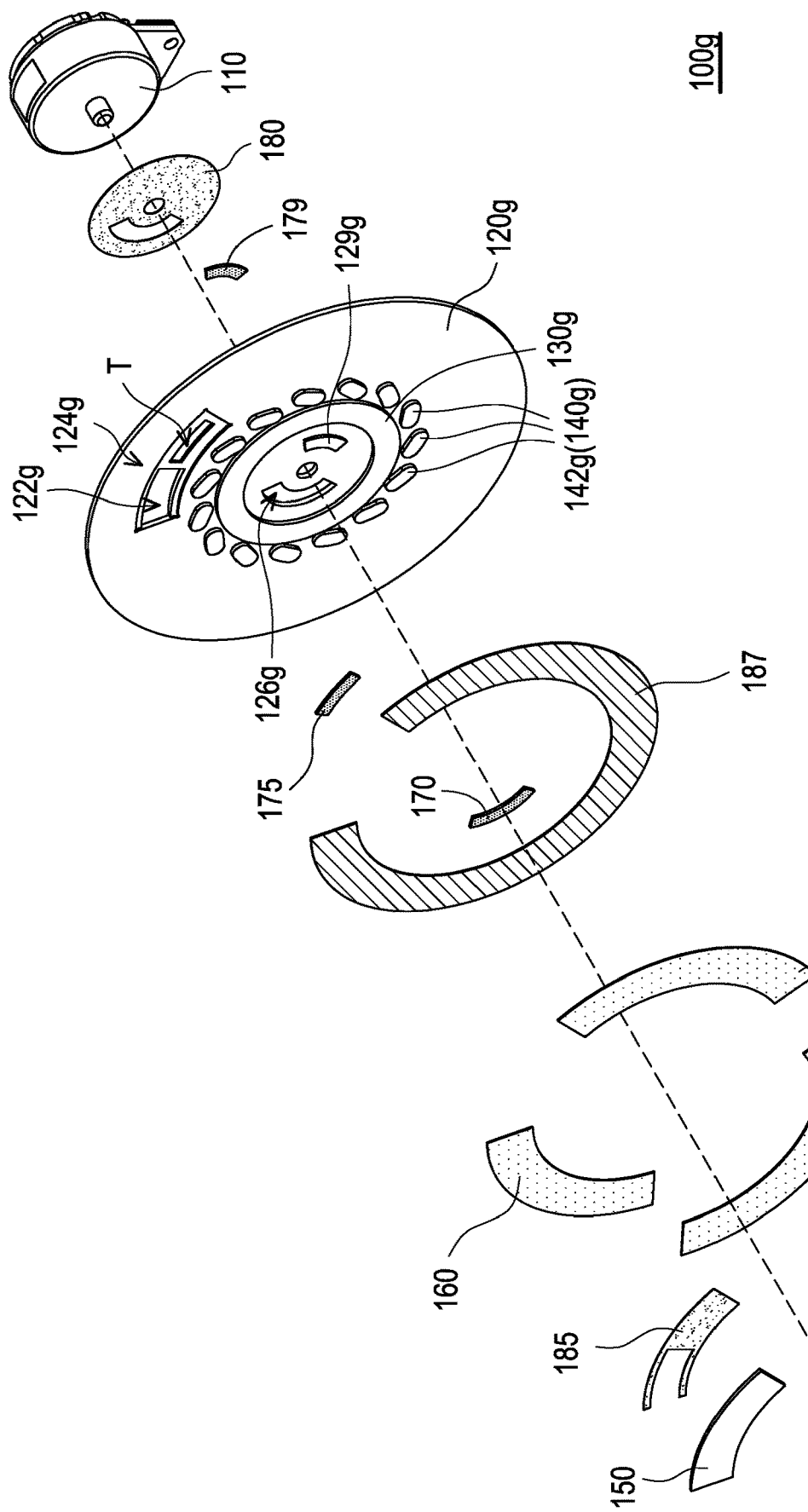
FIG. 8B is a schematic three-dimensional exploded view of the wavelength conversion module of FIG. 8A.
Figure 8C:
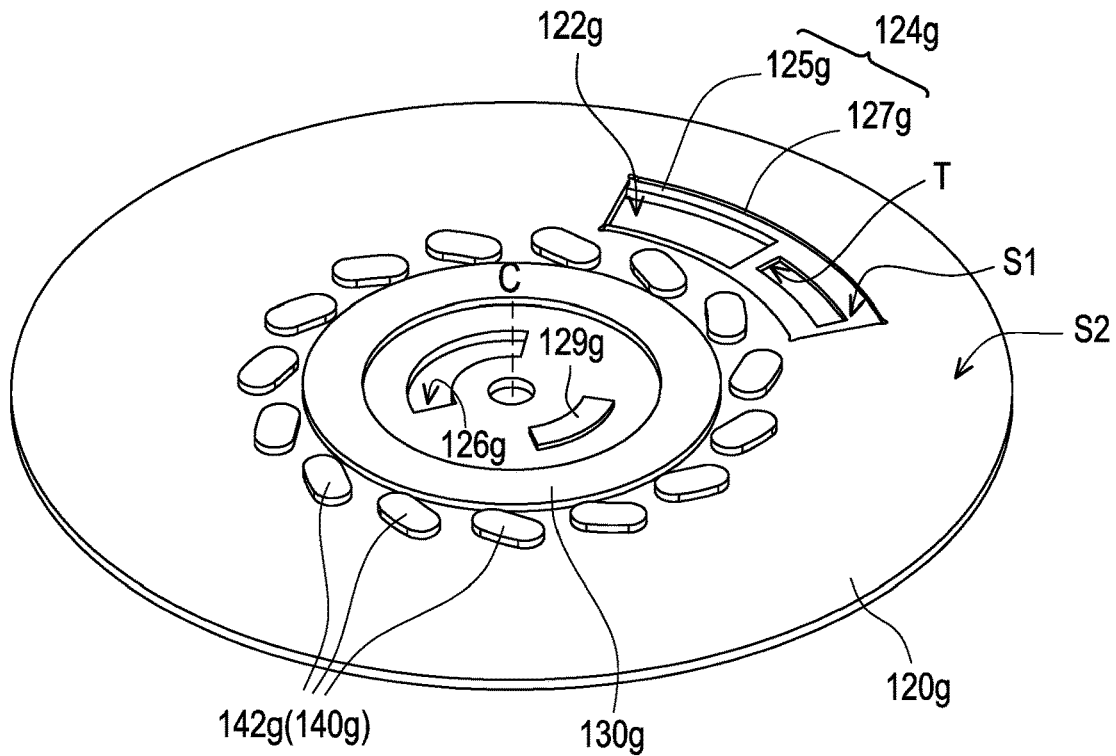
FIG. 8C is a schematic three-dimensional view of a substrate of the wavelength conversion module of FIG. 8A.
Figure 8D:
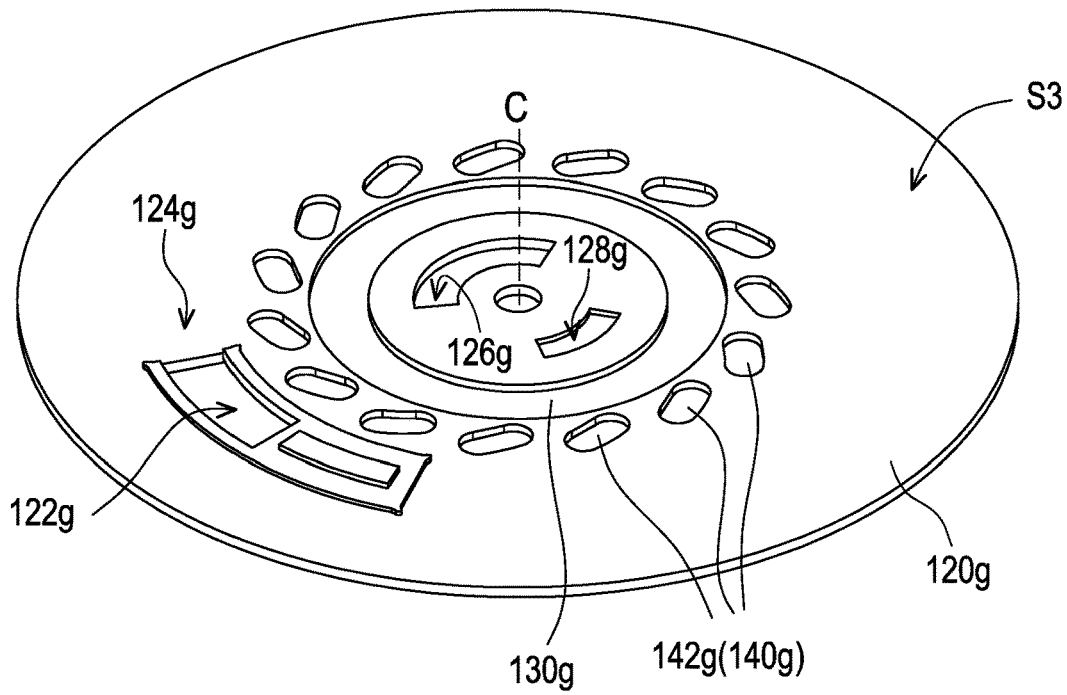
FIG. 8D is a schematic three-dimensional view of the substrate of FIG. 8C from another viewing angle.

FIG. 8A is a schematic three-dimensional view of a wavelength conversion module according to another embodiment of the invention. FIG. 8B is a schematic three-dimensional exploded view of the wavelength conversion module of FIG. 8A. FIG. 8C is a schematic three-dimensional view of a substrate of the wavelength conversion module of FIG. 8A. FIG. 8D is a schematic three-dimensional view of the substrate of FIG. 8C from another viewing angle. Referring to FIG. 7A, FIG. 7B, FIG. 8A, FIG. 8B and FIG. 8C at the same time, a wavelength conversion module 100g of the embodiment is similar to the wavelength conversion module 100f of FIG. 7A, i.e., a second concave-convex structure 140g is located between the annular pattern P and a first concave-convex structure 130g, where the first concave-convex structure 130g is a complete annular protrusion, and the second concave-convex structure 140g includes a plurality of turbulent portions 142g separated from each other. A difference between the wavelength conversion module 100g of the embodiment and the wavelength conversion module 100f of FIG. 7A is that in the embodiment, the wavelength conversion module 100g further includes a filler 175, and a accommodating groove 124g includes a support portion 125g and a sidewall portion 127g. The support portion 125g includes a filling groove T, and the filling groove T is recessed from a bearing surface S1 of the support portion 125g, and the filler 175 is filled in the filling groove T. The transparent plate 150 is fixed on the support portion 125g and completely covers a first balance hole 122g and the filler 175.

Further, referring to FIG. 8B and FIG. 8C at the same time, the wavelength conversion module 100g of the embodiment further includes a balance protrusion 129g located on the surface S2 of the substrate 120g and integrally formed with the substrate 120g, the first concave-convex structure 130g and the second concave-convex structure 140g. The balance protrusion 129g and the second balance hole 126g are respectively located on two sides of the center C in the radial direction of the substrate 120f. Moreover, referring to FIG. 8B and FIG. 8D at the same time, the substrate 120g of the embodiment has the surface S2 and a surface S3 opposite to each other. The substrate 120g further includes a groove 128g on the surface S3, the groove 128g is recessed relative to the surface S3 of the substrate 120g and a position of the groove 128g on the substrate 120g corresponds to the balance protrusion 129g on the surface S2 of the substrate 120g. The groove 128g is located between the first concave-convex structure 130g and the center C in the radial direction of the substrate 120g, and the groove 128g and the second balance hole 126g are respectively located on two sides of the center C in the radial direction of the substrate. In addition, the wavelength conversion module 100g of the embodiment further includes a filler 179 disposed in the groove 128g. Namely, the wavelength conversion module 100g of the embodiment not only has the first balance hole 122g and the second balance hole 126g, but also has the design of the filling groove T, the groove 128g and the balance protrusion 129g, which may effectively achieve balance correction. In addition, a position of the filler 175 is closer to an outer ring region of the substrate than the filler 170, and the filling material per unit weight may achieve a higher correction effect than that of the filler closer to an inner ring region.

In summary, the embodiments of the invention have at least one of following advantages or effects. In the design of the wavelength conversion module of the invention, the substrate is a metal substrate, and the substrate, the first concave-convex structure and the second concave-convex structure are integrally formed, and the substrate has the first balance hole and the accommodating groove, where the first balance hole is located in the accommodating groove and penetrates the substrate, and the transparent plate covers the first balance hole and is arranged in an annular pattern with the wavelength conversion layer. In this way, the effects of balance correction and heat dissipation may be achieved at the same time, so that it is not necessary to configure the metal weight ring through the gluing process as that does in the prior art, accordingly, the process steps may be effectively reduced, the production cost may be reduced and the structural reliability may be improved. In addition, the projection device using the wavelength conversion module of the invention may have higher reliability and longer service life, thereby enhancing product competitiveness.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion module, comprising a driving assembly, a substrate, a first concave-convex structure, a second concave-convex structure, a transparent plate, and a wavelength conversion layer, wherein the driving assembly is connected to the substrate and drives the substrate to rotate around a center of the substrate;

the substrate is a metal substrate, the substrate, the first concave-convex structure, and the second concave-convex structure are integrally formed, and the first concave-convex structure and the second concave-convex structure are disposed around the center of the substrate, the second concave-convex structure surrounds the first concave-convex structure, the substrate has a first balance hole and an accommodating groove, the first concave-convex structure is located between the accommodating groove and the center in a radial direction of the substrate, and the first balance hole is located in the accommodating groove and penetrates the substrate;

the transparent plate is disposed in the accommodating groove of the substrate and covers the first balance hole; and the wavelength conversion layer is disposed on the substrate, and is arranged in an annular pattern with the transparent plate.

2. The wavelength conversion module as claimed in claim 1, wherein the substrate further has a second balance hole, the second balance hole is located between the first concave-convex structure and the center in the radial direction of the substrate and penetrates the substrate, and the driving assembly connected to the substrate covers the second balance hole.

3. The wavelength conversion module as claimed in claim 2, wherein the substrate further comprises a groove, the groove is located between the first concave-convex structure and the center in the radial direction of the substrate, and the groove and the second balance hole are respectively located on two sides of the center.

4. The wavelength conversion module as claimed in claim 1, wherein a first connection line between a center of the first balance hole and the center of the substrate is perpendicular to a second connection line between a center of the second balance hole and the center of the substrate.

5. The wavelength conversion module as claimed in claim 1, wherein the second concave-convex structure is located between the annular pattern and the first concave-convex structure.

6. The wavelength conversion module as claimed in claim 5, wherein the first concave-convex structure is a complete annular protrusion, and the second concave-convex structure comprises a plurality of turbulent portions separated from each other.

7. The wavelength conversion module as claimed in claim 5, wherein the first concave-convex structure comprises a plurality of protrusion portions arranged adjacent to each other, and the second concave-convex structure comprises a plurality of turbulent portions separated from each other.

8. The wavelength conversion module as claimed in claim 1, wherein the annular pattern is located between the second concave-convex structure and the first concave-convex structure.

9. The wavelength conversion module as claimed in claim 8, wherein the first concave-convex structure comprises a plurality of protrusion portions arranged adjacent to each other, the second concave-convex structure comprises a plurality of turbulent portions separated from each other, and at least one of the first concave-convex structure and the second concave-convex structure contacts the wavelength conversion layer.

10. The wavelength conversion module as claimed in claim 9, wherein a first extending direction of any one of the protrusion portions and a second extending direction of the corresponding turbulent portions form a V shape with each other.

11. The wavelength conversion module as claimed in claim 8, wherein the first concave-convex structure comprises a complete annular protrusion and a plurality of extended protrusion portions separated from each other, one end of each of the extended protrusion portions is connected to the annular protrusion and radially extends from the annular protrusion toward the second concave-convex structure, and the second concave-convex structure comprises a plurality of turbulent portions separated from each other.

12. The wavelength conversion module as claimed in claim 11, wherein at least one of the extended protrusion portions and the turbulent portions extends into the wavelength conversion layer to form a first radial width, and the first radial width is greater than $\frac{1}{10}$ of a second radial width of the wavelength conversion layer on the substrate and less than $\frac{1}{2}$ of the second radial width of the wavelength conversion layer.

13. The wavelength conversion module as claimed in claim 8, further comprising:
a third concave-convex structure, integrally formed with the substrate, the first concave-convex structure, and the second concave-convex structure, wherein the third concave-convex structure is disposed around the center of the substrate and located between the second concave-convex structure and the first concave-convex structure, and the annular pattern is located between the second concave-convex structure and the third concave-convex structure.

14. The wavelength conversion module as claimed in claim 13, wherein the first concave-convex structure is a complete annular protrusion, and the second concave-convex structure and the third concave-convex structure respectively comprise a plurality of turbulent portions separated from each other.

15. The wavelength conversion module as claimed in claim 14, wherein an outer side and an inner side of the wavelength conversion layer partially cover the turbulent portions.

16. The wavelength conversion module as claimed in claim 1, wherein the accommodating groove comprises a support portion and a sidewall portion, a bearing surface of the support portion is recessed from a surface of the substrate, and the sidewall portion is connected to the surface of the substrate and the bearing surface of the support portion, the transparent plate is fixed on the support portion, and the support portion surrounds at least two sides of the first balance hole.

17. The wavelength conversion module as claimed in claim 16, further comprising:
a filler, wherein the support portion comprises a filling groove, the filling groove is recessed from the bearing surface, the filler is filled in the filling groove, and the transparent plate is fixed on the support portion and covers the filler.

18. The wavelength conversion module as claimed in claim 16, wherein the first balance hole located in the accommodating groove has a first through portion and a second through portion having different radial widths and disposed adjacent to each other.

19. The wavelength conversion module as claimed in claim 1, further comprising:
a filler, disposed on the substrate, located between the first concave-convex structure and the center in the radial direction of the substrate, and adjacent to the first concave-convex structure.

20. The wavelength conversion module as claimed in claim 1, further comprising:
a first adhesive layer, disposed between the driving assembly and the substrate;
a second adhesive layer, disposed between the transparent plate and the accommodating groove; and
a reflective layer, disposed between the wavelength conversion layer and the substrate.

21. A projection device, comprising: an illumination module, a light valve, and a projection lens, wherein
the illumination module is configured to provide an illumination beam, and the illumination module comprises:
a light source device, configured to provide an excitation beam; and
a wavelength conversion module, arranged on a transmission path of the excitation beam, the wavelength conversion module comprising a driving assembly, a substrate, a first concave-convex structure, a second concave-convex structure, a transparent plate, and a wavelength conversion layer, wherein
the driving assembly is connected to the substrate, and drives the substrate to rotate around a center of the substrate;
the substrate is a metal substrate, the substrate, the first concave-convex structure, and the second concave-convex structure are integrally formed, and the first concave-convex structure and the second concave-convex structure are disposed around the center of the substrate, the second concave-convex structure surrounds the first concave-convex structure, the substrate has a first balance hole and an accommodating groove, the first concave-convex structure is located between the accommodating groove and the center in a radial direction of the substrate, and the first balance hole is located in the accommodating groove and penetrates the substrate;
the transparent plate is disposed in the accommodating groove of the substrate and covers the first balance hole; and
the wavelength conversion layer is disposed on the substrate, and is arranged in an annular pattern with the transparent plate, wherein the wavelength conversion layer receives the excitation beam and generates a converted beam, and the illumination beam comprises the converted beam and the excitation beam;
the light valve is arranged on a transmission path of the illumination beam to convert the illumination beam into an image beam; and
the projection lens is arranged on a transmission path of the image beam to project the image beam out of the projection device.

* * * * *